J. W. HARDIE & A. S. HAYWARD.
COMBINATION KNIFE, FORK, AND SPOON.

No. 34,098.

Patented Jan. 7, 1862.

Witnesses:
R. F. Osgood
Wm. F. Browne

Inventor:
J. W. Hardie,
A. S. Hayward.
By their attorney,
J. S. Brown

UNITED STATES PATENT OFFICE.

J. W. HARDIE, OF NEW YORK, N. Y., AND A. S. HAYWARD, OF BOSTON, MASSACHUSETTS, ASSIGNORS TO A. S. HAYWARD AND JAS. B. OGDEN.

COMBINATION OF KNIFE, FORK, AND SPOON.

Specification of Letters Patent No. 34,098, dated January 7, 1862.

*To all whom it may concern:*

Figure 3:
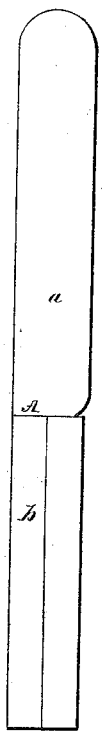
Figure 4:
Figure 5:
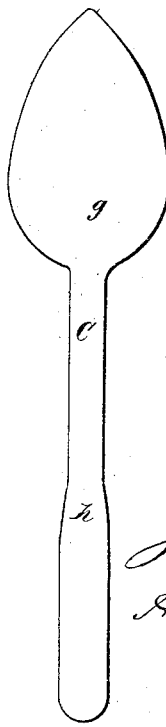
Figure 6:
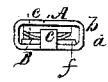

Be it known that we, J. W. HARDIE, of the city, county, and State of New York, and A. S. HAYWARD, of Boston, Suffolk county, Massachusetts, have invented a new and Improved Construction and Combination of Table Knife, Fork, and Spoon; and we do hereby declare that the following is a full and exact description thereof, reference being had to the accompanying drawings, making part of this specification, Figure 1, being a side view of the knife, fork, and spoon, combined and packed together in our improved manner; Fig. 2, an edge view of the same; Figs. 3, 4, and 5, separate views of the knife, fork, and spoon, respectively; Fig. 6, an end view of the handles of all, when packed together.

Like letters designate corresponding parts in all of the figures.

The most important feature of construction pertains to the knife A, solely. The blade $a$, and handle $b$, are made of one piece of sheet steel, the blade being formed of ordinary shape; and the handle $b$, also, of the usual good shape, by forming and swaging the metal so as to produce that shape; and it differs, in its relation to the blade, from ordinary knife handles, only in projecting all from one side of the blade, the other side being flush with the blade. The metal thus forms an interior space in the handle, to be used for the special purpose presently to be set forth, either wholly inclosing the space, or not, as desired. We also turn up a little projection $c$, (Fig. 6,) across the end of this space, more or less, substantially as shown, and for the purpose to be specified.

The fork B, is also made, both tines $d$, and handle $f$, of a single piece of sheet steel, and formed into a good shape and style, and full size, either with two, three, or four tines. The only limit, as to size, required, is to enable the handle $f$, to slide into the handle of the knife, substantially as shown in Figs. 1 and 2.

Figure 1:
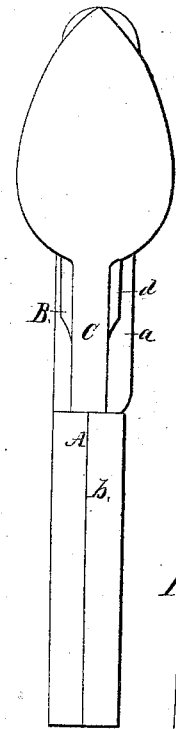
Figure 2:
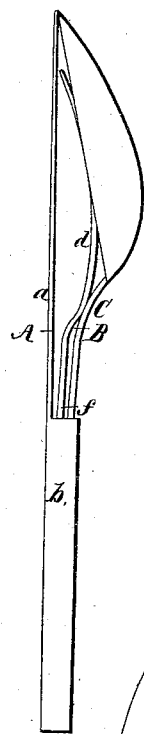

The spoon C, may have the bowl $g$, of the ordinary form; and also the handle, except (as in case of the fork,) that it must be narrow enough to slide into the handle of the knife, over the fork, as shown in Figs. 1, and 2. It may be made of any suitable material.

The three, constructed and united or combined, as described, thus become packed together very closely and conveniently, rendering them very suitable for camp use, or for any use, when compactness and portability are desired. The projection $c$, on the end of the knife handle prevents the handles of the fork and spoon sliding through that end too far; and the curved form and elasticity of the fork and spoon hold them from falling out.

The knife and fork thus made are very convenient, good and otherwise desirable for household use, as well as cheap, in addition to the capability of packing for portability, as above described.

What we claim as our invention and desire to secure by Letters Patent, is—

Forming the handle of the knife A, of a single piece of metal with the blade, in such a shape as to receive therein the fork and spoon handles, in combination with the formation of the fork and spoon handles so as to pack securely therein, substantially as herein specified.

In witness whereof we hereunto set our hands, in presence of witnesses.

J. W. HARDIE.

Witnesses:
L. H. DICKERSON,
D. W. BAIN.